UNITED STATES PATENT OFFICE 2,000,082

ARTIFICIAL MANURE AND METHOD OF PRODUCING SAME

Jacob Kaiser, Vaihingen, and Eberhard Sauer, Stuttgart, Germany

No Drawing. Application March 11, 1931, Serial No. 521,876. In Germany July 16, 1927

1 Claim. (Cl. 71—8)

Our invention refers to a new type of artificial manure and to the means whereby it can be produced. It is an object of our invention to produce an artificial manure from wastes which were hitherto not utilized for this purpose in a satisfactory manner.

As is well known to those skilled in the art, if soil used for agriculture shall be relied upon to furnish satisfactory yields, the addition of inorganic substances (artificial fertilizers) does not suffice, additions of organic substances being required to maintain the bacterial life responsible for the proper condition of the soil. At the same time the physical condition of the soil must be influenced in order to provide for the necessary aeration and hydration of the soil.

Hitherto the stable manure was mainly relied upon to fulfil these conditions, however the quantities of stable manure which are nowadays available, do not suffice to answer the requirements.

It is an object of our invention to provide a substitute for the stable manure, which is at least its equivalent and which is available in sufficient quantities. According to our invention we utilize the organic matter contained in the town sewage. Experiments hitherto made for utilizing the freshly settled sewage sludge have shown it to be unfit for use as an organic manure. For the organic matter contained in this sludge consists mainly of putrescible materials which contain putrefactive bacteria. If these materials are directly incorporated in the soil, the putrefaction will proceed and generate in the soil substances which are injurious to vegetation.

We have therefore found it necessary to subject the sewage sludge to a vigorous decomposition in order to obtain a product, in which the putrescible matter is substantially destroyed. To this end we cause the mass to undergo a process of humification, care being taken to avoid the formation of acids and the access of air. This can be obtained in a perfect manner in the sludge digestion chambers of the settling tanks (Imhoff tanks), where the sludge undergoes far reaching changes, the putrescible materials being vigorously decomposed. The final product resulting in this process, which extends over several months, is a thickly fluid, almost homogeneous mass of colloidal character, in which the organic structure of the many waste materials contained in the sludge is destroyed altogether. This final product forms a suitable basis for the production of a bacterial manure according to the present invention.

We have now found that if this product of decomposition is incorporated in the soil as such, it will remain ineffective and may even prove injurious, as it still lacks the necessary physical character.

In order to impart to it this character, we mix the digested or decomposed sludge with a material presenting a large surface, whereby the sludge is loosened and finely distributed. We have found peat and peat-moss and more especially high-grade peat-dust to be particularly suitable for this purpose.

In preparing the new manure we prefer mixing the putrefied sewage sludge with peat-moss and/or peat-dust in suitable proportions. In thus proceeding we not only produce a mechanical mixture, but we induce important chemical and physical processes, which are responsible for the valuable properties of the new manure.

By suitably proportioning the two components of the mixture we succeed in neutralizing the acid contents of the peat with the alkali contents of the decomposed sludge.

We further cause the colloidal matter in the alkaline sludge to be deprived of its colloidal character by the acid peat, whereby the separation of the water is considerably facilitated.

Furthermore the dry peat, owing to its swelling energy, will take up so much water from the sludge, that a loose strewable manure is obtained without any artificial drying.

Owing to the fine distribution of the sludge material on the surface of the peat the sludge obtains the character of a high-grade nutrient medium for bacteria.

We thus obtain a manure having particularly useful properties.

In practicing our invention we cause the thoroughly digested sludge to flow into a collecting pit, wherein it separates from the water in excess by settling. The sludge is then continuously fed into a mixing device, where it is uniformly mixed with high-grade peat-moss or peat-dust.

We have found that a mixture of about 1 cbm. peat and 1.2 cbm. digested sludge forms a loose and strewable neutral manure.

With a specific gravity of 0.22 for peat and 1.2 for the sludge this proportion is equivalent to 220 kgs. peat and 1440 kgs. sludge.

If the acid contents of 100 kgs. peat can be neutralized with about 2 kgs. CaO and if the alkali contents of 100 kgs. sludge is equivalent to about 0.3 kgs. CaO, 1470 kgs. sludge will be substantially sufficient to neutralize the acid contents of 220 kgs. peat.

With a peat of different acid content and a sludge of different alkali content the proportions of the mixture should of course be altered accordingly.

From the foregoing it will be understood that peat may be used in accordance with our invention in any suitable form, be it peat-dust, peat-moss or the like. The expression "peat" in the affixed claim is intended to mean peat-dust and peat-moss as well as other natural or artificial suitable peat products.

Various changes may be made in the details disclosed in the foregoing specification without departing from the invention or sacrificing the advantages thereof.

We claim:

As a new product, an artificial manure being a substantially neutral mixture of putrefied sludge from town-sewage settling tanks (Imhoff tanks) with peat, the product being loose and strewable.

JACOB KAISER.
EBERHARD SAUER.